March 3, 1964
D. McINTYRE
3,123,408
BRAKE CYLINDER RELEASE VALVE
Filed March 8, 1961
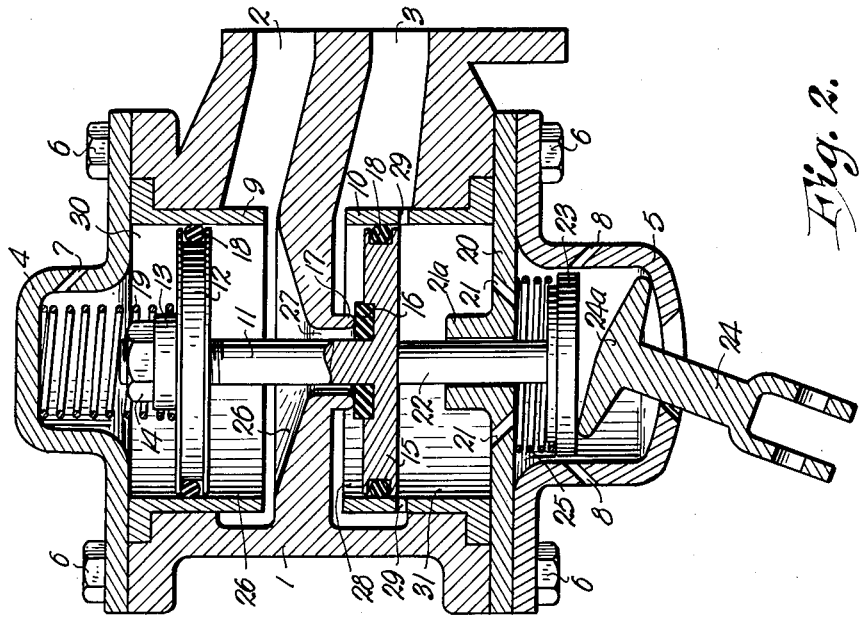
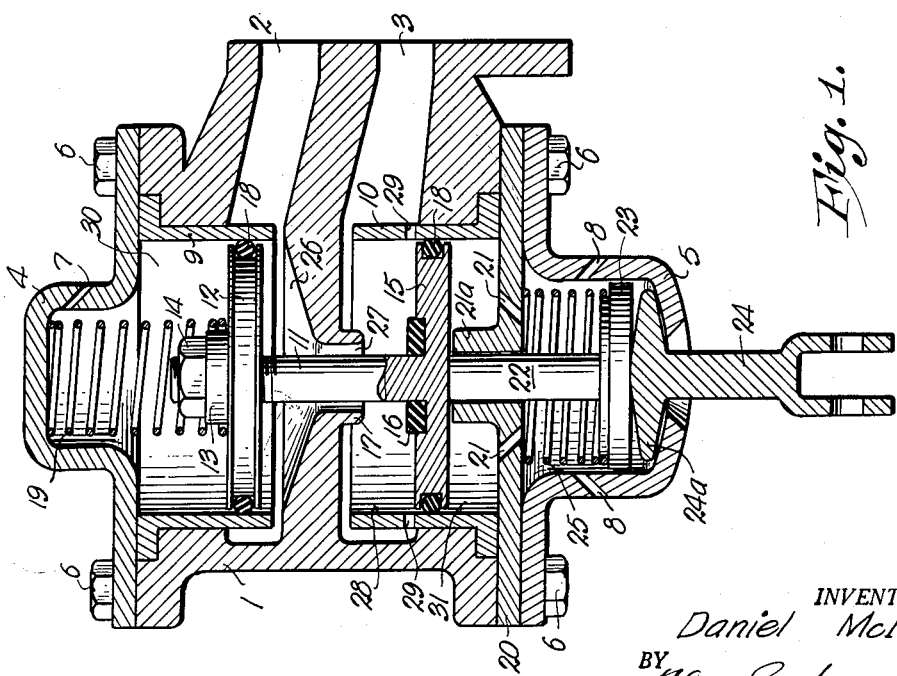
INVENTOR.
Daniel McIntyre
BY
Thos. E. Scofield
ATTORNEY.

United States Patent Office 3,123,408
Patented Mar. 3, 1964

3,123,408
BRAKE CYLINDER RELEASE VALVE
Daniel McIntyre, Affton, Mo., assignor to Gustin-Bacon Manufacturing Company, a corporation of Delaware
Filed Mar. 8, 1961, Ser. No. 94,359
2 Claims. (Cl. 303—68)

This invention relates to improvements in brake cylinder release valves and refers more particularly to a release valve interposed between the air reservoir and control valve of a brake system and the brake cylinder for releasing brake cylinder pressure and resetting the equipment in condition for normal braking operation.

When releasing the brakes on a train for switching freight cars equipped with AB brakes, the air must be drained from the reservoirs and the brake cylinders by means of release valves which usually are a part of the control valve. It is a time-consuming operation especially on a series of cars or a train of some length because it necessitates the holding of the release valve open on each car until the air is completely exhausted from the system. Such bleeding of the system has given rise to an undesirable practice of wedging the release valves of the respective cars open, rendering the brakes inoperative if the wedging devices are not removed. Also when the cars are again assembled into trains considerable time is consumed in recharging the brake systems with air from the drained condition.

As a solution to these problems of time and air consumption in daily switching operations, attention has been given to a type of release valve that can be tripped by a single pull of the release handle or rod to automatically close communication between the air reservoirs and control valves with the brake cylinder and provide for automatically venting the brake cylinder to atmosphere retaining the air in the reservoirs and resetting of the release valve under circumstances to restore normal function of the brake system. A release valve which will accomplish these functions and is able to perform its full cycle of operations without detriment to normal braking operation is found in the design and construction of the instant valve.

The release valve hereinafter described is located in the brake cylinder line between the AB control valve and brake cylinder and eliminates the necessity of a connection with the brake pipe or retainer pipe required in some of the conventional release valves. Where a brake pipe connection with the release valve is used it is possible for the brake pipe air to leak into the brake cylinders during brake applications and if brake pipe pressure exceeds that in the brake cylinder such leakage often results in hot wheels. It is also possible when the release valve is connected to the retainer pipe for brake cylinder pressure to leak into the brake pipe.

Where the brake cylinder release valve has connection with the retainer pipe, brake cylinder pressure may leak into the retainer pipe by way of a leaky check valve in the brake cylinder release valve as the retainer passage to this check valve is an extension of the retainer pipe and does not pass through the slide valve. This makes it possible when single car testing to approve it for leakage if the retainer is turned up or if the gauge fitting is attached to the retainer exhaust. The only method, however, to test for leakage of the check valve is by soap sudsing the retainer exhaust with the retainer handle in a down position and the brake applied. Either of the above conditions require checking at the brake pipe hose for brake cylinder leakage, a task which is unnecessary in the valve of the instant invention since such leakage would be exhausted automatically to atmosphere and could be readily detected by conventional soap-sudsing of the vents in the valve. Also these difficulties are both eliminated where, as here, the brake cylinder release valve has no connection either with the brake pipe or retainer pipe.

An object of the invention, therefore, is to provide a valve of simple construction having a minimum number of moving parts.

A further object is to provide a valve which automatically vents to atmosphere brake cylinder pressure upon functioning of the pull rod or actuating plunger while substantially retaining reservoir pressure.

The construction also provides a release valve which will automatically return to open or operating position when the control valve returns to its release and charging position.

In the accompanying drawings which form a part of the instant specification and are to be read in conjunction therewith, and in which like reference numerals are used to indicate like parts in the various views, there is shown an embodiment of the invention.

FIG. 1 is a sectional side view of the brake cylinder release valve in open position.

FIG. 2 is a like view showing the valve in a closed position upon operation of the pull or release rod or handle.

The release valve comprises a body 1 into which is a connection 2 from the control valve and a connection 3 with the brake cylinder. The body 1 is open ended and has end closures 4 and 5 removably attached to the body by means of bolts 6. Each of the end closures 4 and 5 are dome shaped with vents 7 in closure 4, and vents 8 in closure 5. Within the body are fitted upper bushing 9 and a lower bushing 10. A piston and valve assembly also within the body comprises shaft member 11, an upper piston 12 held in place by means of a washer 13 and nut 14, a lower piston 15 equipped upon its upper surface with a flexible washer or valve 16 adapted to seat at 17 upon an annular depending ring in the body. Pistons 12 and 15 are grooved circumferentially to receive O-rings 18 which fit into and form pressure-tight seals against the interior surfaces of bushings 9 and 10.

A coil spring 19 within the dome of closure 4 has its lower end seated upon the top of piston 12 and constantly urges the piston and valve assembly downwardly to an open position as shown in FIG. 1. Between the body 1 and lower closure 5 is a stop plate 20 through which are vent holes 21 permitting air pressure to be exhausted into the dome of closure 5 and into the atmosphere through vent holes 8. The piston and valve assembly is limited in its downward movement by a boss 21a formed in the plate 21 and the top of plunger 22. This plunger has an enlarged circular plate portion 23 located at the lower end in the dome of closure 5. A pull rod 24 extends through an aperture in the bottom of closure 5 and has an enlarged mushroom shaped head 24a engaged by the bottom surface of plate 23. A compression spring 25 positioned between plate 23 and the lower surface of plate 20 urges pull rod 24 to its normal position with the mushroom head 24a substantially horizontal and the valve 16 in an open position as shown in FIG. 1.

In operation the valve 16 is held in a normally open position by the force of compression spring 19 located above piston 12. During a brake application air flows from the brake controlling device through passage 2 beneath the lower end of bushing 9 into a chamber 26 surrounding shaft or stem 11 and below piston 12. From the chamber 26 the air passes downwardly through the annular duct 27, thence through the unseated valve 16 into chamber 28 above piston 15 in the upper portion of bushing 10. Finally it passes from chamber 28 through the opening top of bushing 10 into duct 3 and thence to the brake cylinder, not shown. At this time ducts 29 in bushing 10 are above piston 15 so air is free to pass through these ducts to passage 3 as well as over the top of the bushing 10. Pistons 12 and 15 being of equal diameter and area and mounted on a common shaft or stem 11, have equal pressure exerted on their opposing faces so that spring 19 is the controlling force.

When the brake controlling device is moved to release position the air from the brake cylinder flows in reverse to that described, and thence to the atmosphere through the exhaust of the brake controlling device. Thus, this brake cylinder release valve permits normal operation of the brakes.

When cars are prepared for switching the brake pipe pressure is exhausted which leaves the brakes applied in either "full service" or "emergency" position. To exhaust the air from the brake cylinder, while retaining it in the reservoir, pull rod 24 is actuated, as shown in FIG. 2, by tipping the mushroom-shaped head 24a from its horizontal position so one end engages and raises plate 23. This raises plunger or push rod 22, lifting the piston assembly and closing valve 16. Operation of the push rod and seating of valve 16 closes the annual passageway 27 between chambers 26 and 28. This upward movement of the piston assembly compresses spring 19 above piston 12 and displaces the air accumulated in chamber 30 above piston 12. The displaced air in this chamber 30 escapes to the atmosphere through vents 7 in closure 4.

Since the valve 16 is now seated, as shown in FIG. 2, and has a considerably smaller area than piston 12, greater air pressure is exerted on the piston which keeps spring 19 compressed and the valve in a closed position. When the pull rod 24 is released and the mushroom-shaped head 24a again assumes a horizontal position, plate 23 and its push rod 22 descend aided by action of the springs 25 and 19.

As the time the piston assembly is raised and valve 16 is closed, as shown in FIG. 2, ducts 29 in bushing 10 allow brake cylinder air to pass from passageway 3 into chamber 31 beneath piston 15. This brake cylinder air entering the chamber beneath piston 15 is then exhausted to atmosphere through ducts 21 in plate 20, and vents 8 in the dome of closure 5 at which time the piston assembly remains in a raised or abnormal position since piston 12 is of larger diameter than valve 16. When the pressure beneath piston 12 is exhausted to the atmosphere by way of the brake control valve (not shown) spring 19 again takes effect and returns the piston assembly to its normal or open position shown in FIG. 1, thus again providing for normal braking operation with the system.

Any leakage by the rubber valve 16 from above escapes around the end of bushing 10 into passage 3, through holes 29, thence into the atmosphere with the brake cylinder exhaust air. This prevents any build-up of pressure above piston 15 which would cause the valve to resume its normally open position with the force of spring 19. As indicated above, the valve will therefore remain in a closed position until brake pipe pressure has been restored and the brake controlling device again assumes its release position.

When brake pipe pressure again reaches a pressure higher than reservoir pressure the brake controlling device will assume such release position. This will exhaust air from chamber 26 through passage 2 and to the atmosphere at the brake controlling device. When no pressure remains in chamber 26 spring 19 will again take effect and force the piston assembly down to its normal open position unseating valve 16 and opening duct 27 while stopping the exhaust to the atmosphere as piston 15 moves below holes 29 in bushing 10. When the piston assembly has moved to its lowered position with the valve 16 open, air again flows in the normal manner and the brakes are ready for normal operation.

When a train of cars with AB brake equipment is assembled the brake systems of the cars must be charged from atmospheric pressure to almost full normal charge before the necessary brake test can be made. Time required and operational delay involved, to say nothing of the consumption of air, are serious and troublesome problems. The air tightness of brake systems and their ability to retain air for extended periods without draining the brake systems is well known. Taking advantage of this feature with properly designed brake cylinder release valves which release brake cylinder pressure while retaining the air charges in the reservoirs likewise are important assets to a brake system.

It is therefore a primary object of the present invention to eliminate difficulties heretofore encountered in brake cylinder release valves and to this end the novel construction above described has been provided. This type of brake cylinder release valve permits exhausting the air from the brake cylinders while retaining the air in the reservoirs. This reduces the time required to bleed the brake system in preparation for switching operations and reduces the time required to recharge the system.

From the foregoing it will be seen that this invention is well adapted to attain the ends and objects hereinabove set forth together with other advantages which are obvious and which are inherent to the srtucture.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described my invention, I claim:

1. In a brake cylinder release valve, the combination of a hollow housing having end closures,
    a first piston receiving chamber in the hollow housing,
    a connection for a brake controlling device communicating into said first housing chamber,
    a second piston receiving chamber in the hollow housing of like cross-sectional area to that of the first housing chamber;
    a connection for a brake cylinder communicating into said second housing chamber;
    means in said hollow housing dividing the first and second piston housing chambers from one another and having a restricted opening therethrough;
    first and second pistons of equal cross-sectional area in said first and second housing chambers reciprocable in wall sealing fashion within said chambers.
    a piston rod connecting said pistons to form a piston assembly and extending through said restricted opening and of insufficient diameter to seal same whereby to form a sealed passageway through said hollow housing communicating between said connections and between the opposed faces of said pistons when the piston assembly is in a normal or open position;
    means on said second piston for sealing said restricted opening when the piston assembly is moved to an abnormal or closed position;
    means for venting the brake cylinder connection into the second housing chamber on the side of the second piston away from the restricted opening when the piston assembly approaches closed position;
    spring means in the hollow housing normally urging the piston assembly away from said closed position to said open position;
    the second chamber continuously vented to atmosphere on the side of the second piston away from said restricted opening;
    the first chamber continuously vented to atmosphere on the side of the first piston away from the restricted opening;
    and pull means engageable with the piston assembly for overcoming the force of the spring means and moving the piston assembly to closed position.

2. A valve as in claim 1 wherein said chambers each contain a bushing within which the respective pistons reciprocate in wall sealing fashion and wherein said means for venting the brake cylinder connection into the second housing chamber comprises at least one opening through the bushing in said chamber.

References Cited in the file of this patent

UNITED STATES PATENTS

| | | |
|---|---|---|
| 2,388,538 | Hamrick | Nov. 6, 1945 |
| 2,508,206 | Whitney | May 16, 1950 |
| 2,886,377 | Martin | May 12, 1959 |